I. B. GREEN.
Wheel-Plows.

No. 139,059. Patented May 20, 1873.

Witnesses:
Chas. Nida
Sedgwick

Inventor:
I. B. Green
Per
Attorneys.

AM. PHOTO-LITHOGRAPHIC CO. N.Y. (OSBORNE'S PROCESS)

UNITED STATES PATENT OFFICE.

ISAAC B. GREEN, OF GILLESPIE, ILLINOIS.

IMPROVEMENT IN WHEEL-PLOWS.

Specification forming part of Letters Patent No. 139,059, dated May 20, 1873; application filed March 15, 1873.

*To all whom it may concern:*

Figure 1:
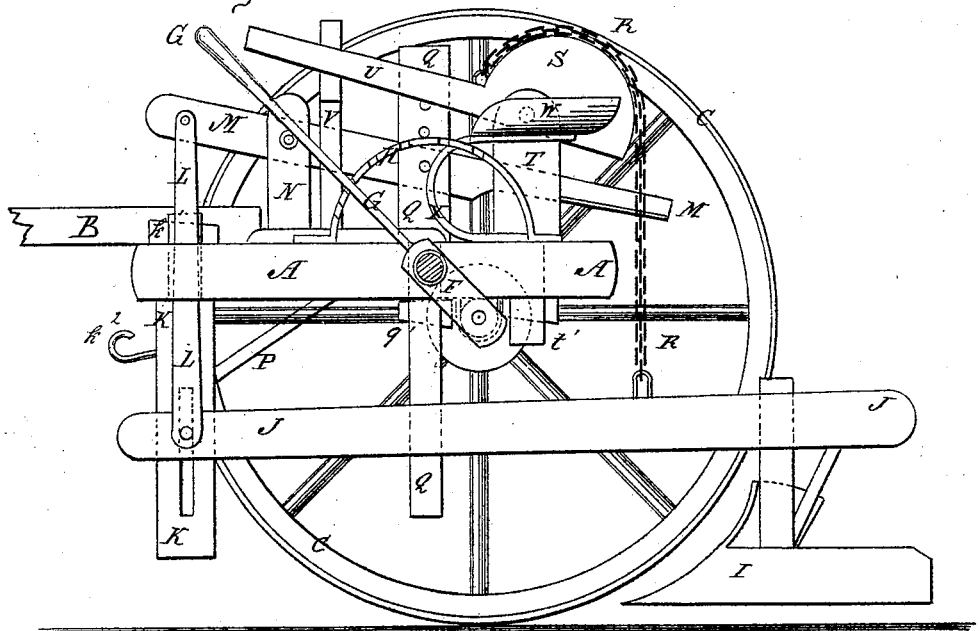
Figure 2:
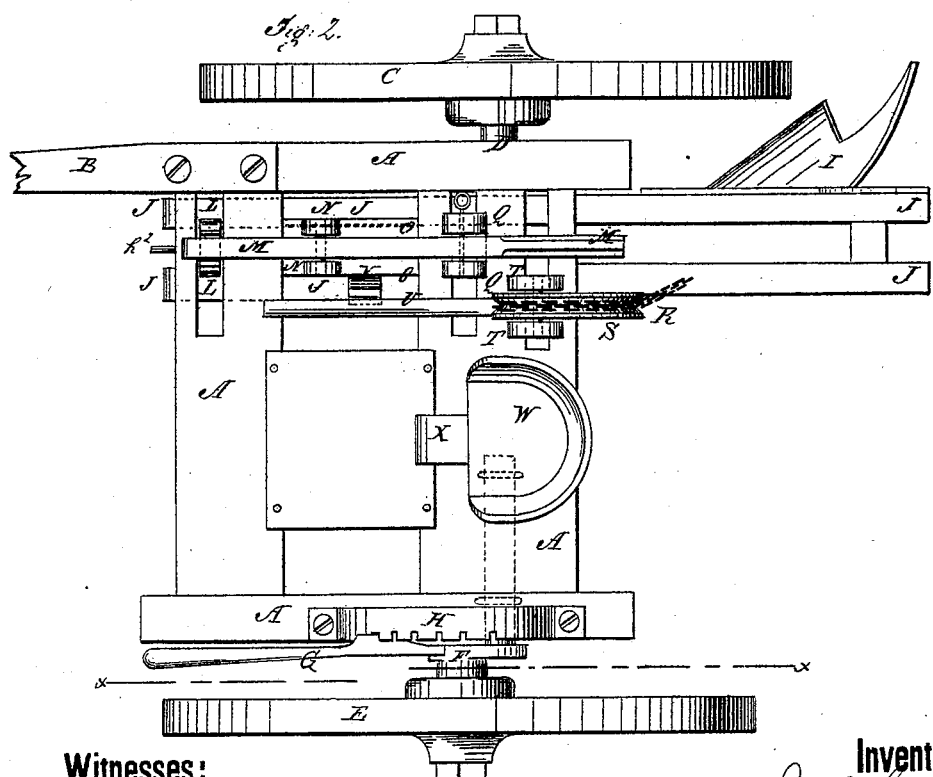

Be it known that I, ISAAC B. GREEN, of Gillespie, in the county of Macoupin and State of Illinois, have invented a new and useful Improvement in Wheel-Plow, of which the following is a specification:

Figure 1 is a side view of my improved plow, partly in section, through the line $x\ x$, Fig. 2. Fig. 2 is a top view of the same.

Similar letters of reference indicate corresponding parts.

The invention consists in the improvement of wheel-plows, as hereinafter described and pointed out in the claim.

A is the frame of the machine, to the forward part of which, near the plowed-land side, is attached the tongue B. The furrow-wheel C revolves upon an axle, D, attached to the frame A. The land-wheel E revolves upon the journal of a crank-axle, F, which works in bearings attached to the frame A. To the crank-axle F is rigidly attached a lever, G, which projects across a semicircular notched bar, H, attached to the end of the frame A, so as to hold the lever G securely in any position into which it may be adjusted. By this construction, by operating the lever G, the wheel E may be raised and lowered to keep the machine level, whether the wheel C be running in a furrow or upon level ground. I is the plow, which is attached to the beam J. The beam J is made of two parallel bars bolted to each other, and held at the proper distance apart by two or more blocks interposed between and secured to them. K is the draft-standard, the lower end of which is inserted between the forward ends of the bars of the beam J, with which it is connected by a bolt that passes through the ends of the said bars, and through a slot in the said standard, so that the forward end of the plow-beam can be conveniently raised and lowered to regulate the depth at which the plow works in the ground. The upper end of the standard K passes up through a transverse slot in the frame A, where it is secured in place, adjustably, by a wedge-key, $k^1$, driven through a hole in the said standard above the said frame. To the outer sides of the forward ends of the bars that form the plow-beam J are attached the lower ends of two straps, L, which pass up along the opposite sides of the standard K through the slot in the frame A, and are attached to the opposite sides of the forward end of a lever, M. The lever M is pivoted to the upper end of a short standard, N, the lower end of which is attached to a block, O, the ends of which enter and slide in slots formed in the adjacent edges of the cross-timbers of the frame A, so that the lever M and its support may be adjusted to correspond with the adjustment of the draft-standard K. The draft is applied to a hook, $k^2$, attached to the middle part of the standard K, and the draft-strain upon the said standard K is sustained by the brace P, the forward end of which is secured to the lower part of said standard, and its upper end is secured to the block O. The rear end of the lever M passes back into such a position that it can be conveniently reached and operated by the driver from his seat. The rear part of the lever M passes through a slotted guide, Q, where it is secured in place by a pin, which passes through it, and through one or the other of a number of holes in the said slotted guide Q, so that by adjusting the lever M the forward end of the plow-beam may be adjusted to cause the plow to run deeper or shallower in the ground, as may be required. The guide Q passes down through a slot in the frame A, so that it may be adjusted laterally to correspond with the adjustment of the lever M and draft-standard K. The guide Q is secured in place when adjusted by a wedge-key, $q'$, driven through it below the said frame A. The lower part of the guide Q projects downward and enters the space between the bars of the beam J, so as to serve also as a guide to keep the plow in line. R is a chain, the lower end of which is attached to the rear part of the plow-beam J, and its upper end passes around and is secured to a segmental pulley or eccentric, S, which is pivoted to a standard, T, and which is provided with a lever, U, for convenience in operating it. The lever U projects forward into such a position that it may be conveniently reached and operated by the driver from his seat. The lever U moves up and down along the side of a catch-bar, V, attached to the block O.

By this construction, by operating the lever

U the plow may be easily raised from the ground for convenience in turning or passing from place to place. The lower end of the standard T passes through a slot in the frame A, and is secured in place by a wedge-key, $t'$, driven through it below the said frame A.

By this construction all the parts by which the plow is connected with the frame A may be moved laterally toward or from the furrow-wheel C to adapt the machine to be used with a two, three, or four horse team, as may be required.

W is the driver's seat, which is supported upon a spring-standard, X, attached to the frame A.

Having thus described my invention, I claim as new and desire to secure by Letters Patent—

The pendent standard K and guide Q, arranged under the axle, in combination with a two-barred plow-beam, as and for the purpose described.

ISAAC BROCK GREEN.

Witnesses:
N. D. SHACKELFORD,
J. B. CRAWFORD.